United States Patent [19]

Lee et al.

[11] E Patent Number: Re. 33,189

[45] Reissued Date of Patent: Mar. 27, 1990

[54] SECURITY SYSTEM FOR SSTV ENCRYPTION

[75] Inventors: Lin-nan Lee; Russell J. Fang, both of Potomac, Md.

[73] Assignee: Communications Satellite Corporation, Washington, D.C.

[21] Appl. No.: 409,955

[22] Filed: Sep. 18, 1989

Related U.S. Patent Documents

Reissue of:

[64] Patent No.: 4,484,027
Issued: Nov. 20, 1984
Appl. No.: 322,833
Filed: Nov. 19, 1981

U.S. Applications:

[63] Continuation of Ser. No. 192,014, May 9, 1988, abandoned.

[51] Int. Cl.[4] ..... H04L 9/02; H04K 1/02

[52] U.S. Cl. ..... 380/20; 380/21; 380/47

[58] Field of Search ..... 380/10, 20, 21, 23, 380/25, 43, 44, 46, 47, 12, 13, 19

[56] References Cited

U.S. PATENT DOCUMENTS

| | | | |
|---|---|---|---|
| 3,238,297 | 3/1966 | Pawley et al. | 380/20 |
| 3,649,913 | 3/1972 | Mildonian, Jr. | 455/26 |
| 3,659,046 | 4/1972 | Angeleri et al. | 178/22.13 |
| 3,717,206 | 2/1973 | Zopf et al. | 380/20 |
| 3,733,431 | 5/1973 | Kirk, Jr. et al. | 380/13 |
| 3,769,448 | 10/1973 | Court | 380/20 |

(List continued on next page.)

FOREIGN PATENT DOCUMENTS 2050021 12/1980 United Kingdom .

OTHER PUBLICATIONS

J. Everton, "Adaptation of the Basic Hierarchy for Encryption Key Management to Serve Applications With Conflicting Requirements," IEEE, 1979, pp. 186–191.

F. Heinrich, "The Network Security Center: A System Level Approach to Computer Security", National Bureau of Standards Special Publication 500-21, vol. 1, Jan. 1978.

S. Kent, "Encryption-Based Protection Protocols for Interactive User-Computer Communication," NTIS Technical Report 162, May 1976.

S. Kent, "Security Requirements and Protocols for a Broadcast Scenario," IEEE Transactions on Communications, vol. COM-29, No. 6, Jun. '81, pp. 778–786.

I. Ingemarson et al, "Encryption and Authentication in On-Board Processing Satellite Communication Systems," IEEE Transactions on Communications, vol. COM-29, No. 11, Nov. 1981, pp. 1684–1687.

M. Sendrow, "A Method of Authentication in EFT Networks Using DES Without Downline Loading of Working Keys," 1980, IEEE, pp. 168–175.

*Primary Examiner*—Salvatore Cangialosi
*Attorney, Agent, or Firm*—Sughrue, Mion, Zinn, Macpeak & Seas

[57] ABSTRACT

In a secure communications system, a key number which is changed periodically, e.g. monthly, and a random number from a random number generator are combined and used as a seed to reset a PN sequence generator, with the output of the generator being used to control encryption of transmission data in a signal processor. The key is also provided to a first encipherer to encipher the random number for transmission with the encrypted data. At the receiver, the key is provided on common to a decipherer for deciphering the random number and a PN sequence generator which is periodically reset by the combination of the key and random number in the same manner as in the transmitter. The PN sequence is then used to decrypt the information. User identification codes are stored in the transmitter and are used to encipher the key, with each employing its ID code to decipher the key. The user ID codes are known only to the system operator, so that not even a particular user can know the key.

50 Claims, 1 Drawing Sheet

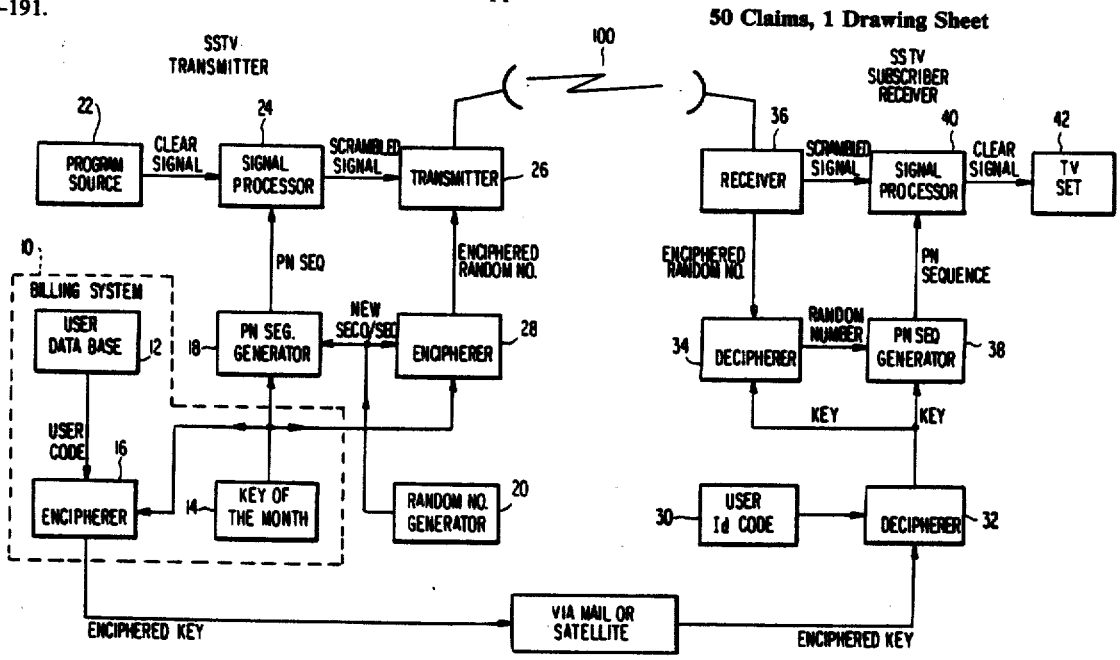

U.S. PATENT DOCUMENTS

| | | | |
|---|---|---|---|
| 3,801,732 | 4/1974 | Reeves | 358/124 |
| 3,824,332 | 7/1974 | Horowitz | 380/20 |
| 3,826,863 | 7/1974 | Johnson | 380/20 |
| 3,852,519 | 12/1974 | Court | 380/12 |
| 3,857,997 | 12/1974 | Toonder | 358/86 |
| 3,911,204 | 10/1975 | Spinelli | 380/20 |
| 3,911,216 | 10/1975 | Barket et al. | 178/22.15 |
| 3,914,534 | 10/1975 | Forbes | 358/122 |
| 3,916,091 | 10/1978 | Kirk, Jr. et al. | 380/20 |
| 3,919,462 | 11/1975 | Hartung et al. | 380/20 |
| 3,934,079 | 1/1976 | Barnhart | 358/86 |
| 3,936,593 | 2/1976 | Aaronson et al. | 380/20 |
| 3,956,615 | 5/1976 | Anderson et al. | 380/24 |
| 3,982,062 | 9/1976 | Simons | 380/12 |
| 3,996,418 | 12/1976 | Murphy et al. | 380/20 |
| 3,997,718 | 12/1976 | Ricketts et al. | 380/20 |
| 3,999,005 | 12/1976 | Dickinson | 380/12 |
| 4,024,574 | 5/1977 | Nieson | 380/20 |
| 4,025,948 | 5/1977 | Loshin | 380/20 |
| 4,034,402 | 7/1977 | Brian | 380/19 |
| 4,058,830 | 11/1977 | Guinet et al. | 358/114 |
| 4,068,264 | 2/1978 | Pires | 380/20 |
| 4,070,693 | 1/1978 | Shutterly | 380/20 |
| 4,075,660 | 2/1978 | Horowitz | 380/20 |
| 4,081,831 | 3/1978 | Tang et al. | 380/20 |
| 4,081,832 | 3/1978 | Sherman | 358/122 |
| 4,091,413 | 5/1978 | Herman | 380/13 |
| 4,091,417 | 5/1978 | Nieson | 380/20 |
| 4,104,486 | 8/1978 | Martin et al. | 379/106 |
| 4,109,281 | 8/1978 | Kanazashi et al. | 380/13 |
| 4,112,464 | 9/1978 | Guif et al. | 380/20 |
| 4,115,807 | 9/1978 | Pires | 358/122 |
| 4,118,669 | 10/1978 | Fung | 380/20 |
| 4,126,762 | 11/1978 | Martin et al. | 379/106 |
| 4,130,833 | 12/1978 | Chomet | 380/20 |
| 4,148,063 | 4/1979 | Chomet | 380/19 |
| 4,161,751 | 7/1979 | Ost | 380/20 |
| 4,163,254 | 7/1979 | Block et al. | 380/20 |
| 4,200,770 | 4/1980 | Hellman et al. | 178/22.11 |
| 4,225,884 | 9/1980 | Block et al. | 380/20 |
| 4,292,650 | 9/1981 | Hendrickson | 358/122 |
| 4,310,720 | 1/1982 | Check, Jr. | 178/22.08 |
| 4,317,957 | 3/1982 | Sendrow | 380/45 |
| 4,323,921 | 4/1982 | Guillou | 380/20 |
| 4,337,483 | 6/1982 | Guillou | 380/20 |
| 4,354,201 | 10/1982 | Sechet et al. | 358/122 |
| 4,365,110 | 12/1982 | Lee et al. | 178/22.09 |
| 4,388,643 | 6/1983 | Aminetzah | 380/20 |
| 4,398,216 | 8/1983 | Field et al. | 380/20 |
| 4,405,942 | 9/1983 | Block et al. | 380/14 |
| 4,410,911 | 10/1983 | Field et al. | 380/20 |
| 4,484,027 | 11/1984 | Lee et al. | 380/21 |
| 4,528,589 | 7/1985 | Block et al. | 380/20 |
| 4,531,020 | 7/1985 | Wechselberger et al. | 380/21 |
| 4,531,021 | 7/1985 | Bluestein et al. | 380/21 |
| 4,600,942 | 7/1986 | Field et al. | 380/20 |

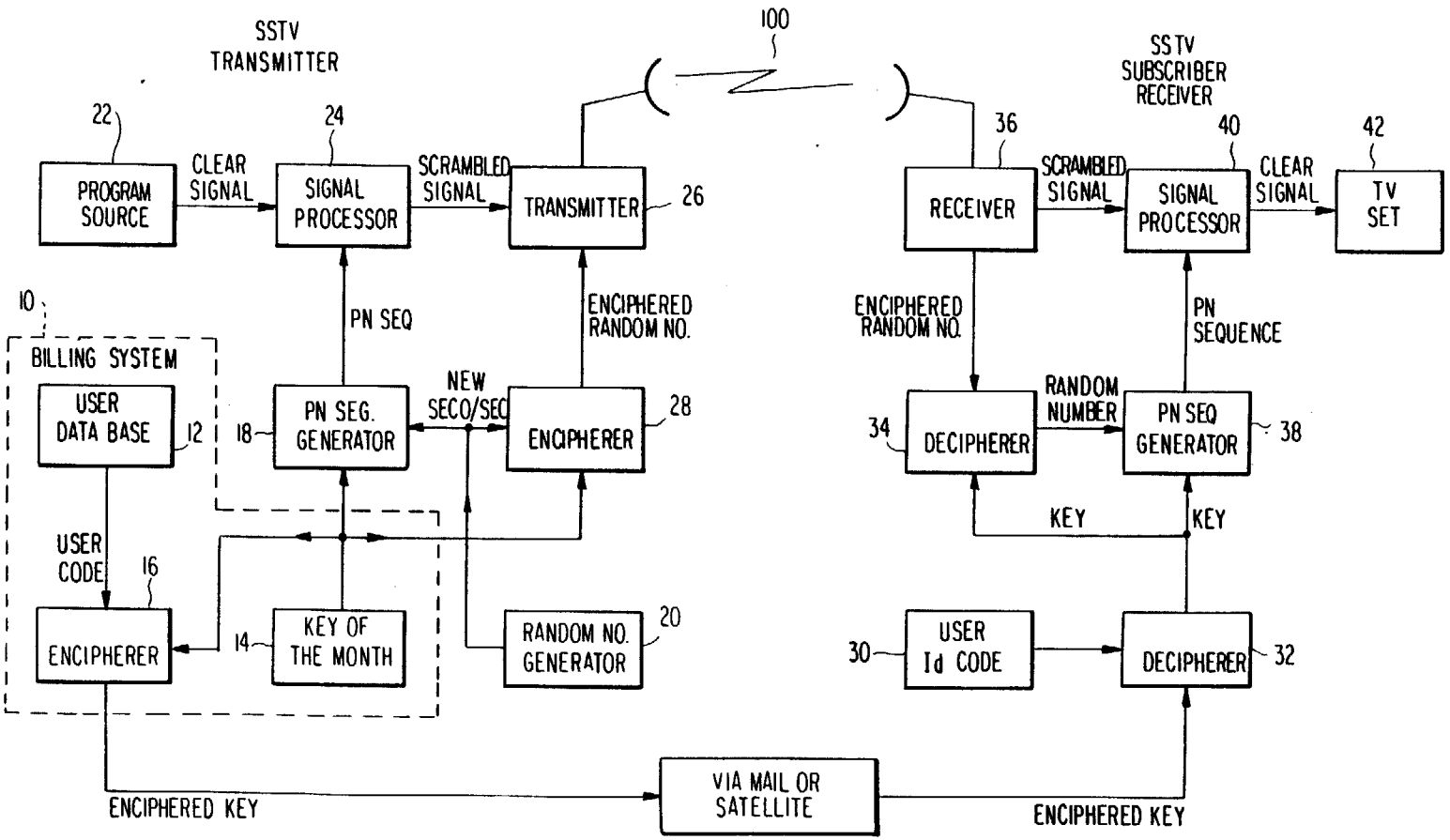
SSTV SUBSCRIBER RECEIVER
SSTV TRANSMITTER
TV SET
42
CLEAR SIGNAL
SIGNAL PROCESSOR
40
PN SEQUENCE
PN SEQ GENERATOR
38
KEY
DECIPHERER
32
SCRAMBLED SIGNAL
RANDOM NUMBER
KEY
RECEIVER
36
ENCIPHERED RANDOM NO.
DECIPHERER
34
USER Id CODE
30
ENCIPHERED KEY
100
VIA MAIL OR SATELLITE
TRANSMITTER
26
ENCIPHERED RANDOM NO.
ENCIPHERER
28
RANDOM NO. GENERATOR
20
SCRAMBLED SIGNAL
NEW SEC0/SEC
SIGNAL PROCESSOR
24
PN SEQ
PN SEG. GENERATOR
18
KEY OF THE MONTH
14
CLEAR SIGNAL
PROGRAM SOURCE
22
BILLING SYSTEM
10
USER DATA BASE
12
USER CODE
ENCIPHERER
16
ENCIPHERED KEY

SECURITY SYSTEM FOR SSTV ENCRYPTION

Matter enclosed in heavy brackets [ ] appears in the original patent but forms no part of this reissue specification; matter printed in italics indicates the additions made by reissue.

*This is a continuation of application No. 07/192,014 filed May 9, 1988, now abandoned seeking Reissue of U.S. Pat. No. 4,484,027.*

BACKGROUND OF THE INVENTION

The present invention is related to the confidentiality of television signal transmissions, and more particularly to the protection of TV signal transmissions from unauthorized reception. The environment in which the present invention may be widely applicable, and in the context of which the invention will be described herein, is that of subscriber television and TV program distribution.

Subscriber television systems are becoming increasingly widespread wherein TV signals are sent out via a cable network or over the air and are intended for reception and viewing by only those subscribers who have paid a monthly fee. With the increase in subscriber television systems has also come an increase in the number of people attempting to receive and display the premium television programs without payment. Thus, there is a need for more sophisticated security techniques for preventing such unauthorized reception.

Many existing subscriber television systems utilize, directly or indirectly, signals transmitted via satellite, and it is becoming quite common for non-paying individuals to receive and display the premium television programs via television receive only (TVRO) antennas, thus resulting in a substantial loss of revenue for the distributors of the subscription television programs. In addition, various direct satellite broadcast television systems are currently being proposed wherein subscription television programs will be broadcast directly via satellite to individual subscriber homes. These subscription satellite television (SSTV) systems will be quite vulnerable to unauthorized reception, and an effective security technique is therefore highly desirable.

The purpose of a security subsystem for an SSTV system is to protect the distributor's business interest and, accordingly, the following objectives should be achieved:

(1) To prevent a non-subscriber from receiving intelligible video and audio signals by using a regular home television set;

(2) To prevent a delinquent subscriber from receiving intelligible video and audio signals by using the SSTV decoder;

(3) To prevent a legitimate subscriber from receiving intelligible video and audio signals of unsubscribed SSTV channels or programs;

(4) To discourage an average technician from building his own receiver capable of obtaining acceptable quality video and audio signals;

(5) To discourage a small unauthorized business concern from manufacturing and marketing devices which are capable of receiving and displaying acceptable quality video and audio signals from the SSTV channels; and (6) To allow a legitimate subscriber to receive and display high quality video and audio signals from the subscribed channels or programs.

It would also be highly desirable to achieve the above objectives at a reasonable cost.

A number of security systems for CATV exist, most of which involve the suppression or removal of the horizontal sync pulses from the video signal before transmission, and the recovery of the sync pulses at the receive end. These techniques will prevent people without the sync recovery circuits from receiving and displaying the programs and may therefore achieve objectives (1) and (6) above, but [those] *these* security systems do not achieve objectives (2) and (3) and, since sync recovery circuits are relatively easily designed and manufactured, also do not satisfy objectives (4) and (5).

More sophisticated techniques may include additional intelligence in the subscriber's decoder box, including the capability of receiving commands from a control center which are specifically addressed to an individual subscriber and are used to turn on or off some or all of the channels. These more sophisticated security techniques may succeed in achieving objectives (1)–(3) and (6), but still do not satisfy objectives (4) and (5). For example, most of these techniques involve the checking of a password, and a particular channel is turned on only if the password is matched. This could be relatively easily by-passed by modifying the subscriber's decoder box or building a separate box with all of the necessary features except the on/off switch. Further, subscribers may also be able to tamper with the decoder box to receive more programs than are actually paid for.

SUMMARY OF THE INVENTION

It is an object of the present invention to provide a security subsystem for a subscription television system wherein all of the above-mentioned objectives (1)–(6) are achieved.

It is a further object of this invention to provide such a security subsystem of minimal cost and complexity.

These and other objects are achieved according to the present invention by using a cryptographic technique for scrambling and descrambling of the video signals. The scrambling and descrambling techniques utilize a "key" which is changed on a regular basis and is sent only to paid subscribers, and even this "key" is sent in a different encrypted form to each subscriber so that delinquent subscribers cannot learn the current key from others.

A record is kept of unique user ID codes corresponding to each subscriber, and in a transmitter according to the preferred embodiment of this invention, the key is ciphered with each subscriber's unique ID code prior to sending the key to that subscriber. A random number generator in the transmitter generates a new random number at regular intervals, for example, every second, and this number is combined with the key, and the combined number is then used as a seed to reset a PN sequence generator every second. This PN sequence generator will thus generate a PN sequence with a random seed in one-second segments, and the segmented PN sequence is supplied to a signal processor where it is used to scramble the audio and video program signals. The random number generator is also ciphered with the key and the enciphered random number is continually transmitted with the scrambled video signal.

At the receiver, the enciphered key, which has been sent either via satellite or mail, is deciphered in the receiver utilizing the particular subscriber's unique ID code, which ID code is internal to the receiver and is unknown to the subscriber. The deciphered key is then in turn used to decipher the enciphered random number received with the scrambled program signal. The deciphered key and random number are then combined as in the transmitter, and the combined signal is used to continually reset a PN sequence generator identical to that in the transmitter so that a segmented PN sequence will be generated in the reciver which is identical to that generated in the transmitter, and this segmented PN sequence can then be used to descramble the received signal. The descrambled signal will then be supplied to the subscriber television set.

BRIEF DESCRIPTION OF THE DRAWING

The invention will be more clearly understood with reference to the following description in conjunction with the accompanying drawing wherein the single FIGURE is a block diagram of the essential components of the SSTV security system according to the present invention.

DETAILED DESCRIPTION OF THE PREFERRED EMBODIMENT

The drawing illustrates a functional block diagram of the SSTV security system according to this invention. The SSTV transmitter will typically include or have access to a billing system computer 10 which will store subscriber information including a list of paid subscribers and their corresponding unique user ID codes. This information may typically be stored in a user data base 12 within the computer. Also within the computer will be a register 14 or the like containing a key which will be changed on a regular basis, e.g. monthly. In preparation for sending this "key of the month" to each current subscriber, the key is enciphered in an encipherer 16 with the user ID code unique to that particular current subscriber, and the enciphered key is then sent to the subscriber.

The transmitter includes a pseudo-random number (PN) sequence generator 18 and a random number generator 20. The random number generator 20 periodically generates a new random number, e.g. once every second, and the outputs of the random number generator 20 and key register 14 are combined and loaded into the PN sequence generator 18 to periodically reset or "seed" the PN sequence generator 18 in a manner well known in the art. Each seeding of the sequence generator 18 will begin a new segment of the PN sequence. The program signal from source 22 is supplied to a signal processor 24 where it is encrypted with the segmented PN sequence from generator 18. The encryption technique used may be any one of a variety of well known techniques and need not be discussed in detail herein. The encrypted, or scrambled, signal is then provided to a transmitter 26 for transmission over link 100 to the various subscriber receivers.

The random number from generator 20 is enciphered with the key of the month in an encipherer 28, and the enciphered random number is transmitted with the scrambled video signal over the link 100.

At the receiver, a register 30 or the like internal to the subscriber TV receiver contains a subscriber-specific secret user ID code which is set prior to installation and is stored in the user data base 12 of the billing computer at the transmitter. Thus, when the subscriber receiver receives the enciphered key or when the user receives the enciphered key by mail and enters the enciphered key into the receiver, a decipherer 32 in the receiver deciphers the enciphered key with the secret user ID code specific to that particular subscriber, and the deciphered key is provided to a decipherer 34. A receiver 36 separates the scrambled signal from the enciphered random number received over link 100 and provides the enciphered random number to the decipherer 34 where it is deciphered with the key received from the decipherer 32. The deciphered random number and key are then combined and loaded into the PN sequence generator 38 to reset or "seed" the sequence generator in the same manner as in the transmitter, to thereby result in the same segmented PN sequence as was used for scrambling in the SSTV transmitter signal processor 24. This segmented PN sequence is then provided to signal processor 40 where it is used to descramble the received program signal. The descrambled signal is then provided to the subscriber television set 42.

The above-described security system provides a novel technique for generating and synchronizing a segmented pseudo-random number (PN) sequence, and a secure key distribution method. The segmented PN sequence generated is used to control the video and audio signal processors that scramble and descramble the program signals. Since a different segmented PN sequence will be generated by each distinct key, the scrambling sequence is different for each key, and by periodically changing the key the scrambling and descrambling sequences will change. Thus, it is not possible for anyone without exact knowledge of the current key to descramble the received program signal with or without a descrambling device.

For each given duration of time, a particular channel is scrambled by a PN sequence that is generated by a randomly selected number and the key of the month. To prevent subscribers of different channels from exchanging the keys among themselves, it is essential that the key for a given channel distributed to each subscriber look different, and this accomplished by enciphering the key with each subscriber's unique user ID code. In this way, although a single key is provided by the register 14 at any one time, a different key is required by each subscriber. It is only when the subscriber-specific key is entered into the receiver that the true key of the month contained in register 14 can be provided to the decipherer 34 and sequence generator 38, and the deciphering of this true key of the month in the decipherer 32 is performed internally of the subscriber receiver and without the subscriber's knowledge.

An important feature of any security system is that a legitimate subscriber must be capable of obtaining synchronization within a short period of time. In the system according to the present invention, the PN sequence used for scrambling and descrambling the signal in signal processors 24 and 40, respectively, is separated into short segments each of which is seeded by the combination of the key of the month and a random number which changes, for example, once every second. Thus, assuming that a legitimate subscriber does have his appropriate key, the time required to acquire synchronization will be substantially equal to the duration of each random number so that synchronization can be acquired rapidly in case of loss of sync due to power outages, rainstorms, changing of channels, etc.

The individual components in the security system according to the present invention are known in the art and need not be described in detail herein since the internal details of these components do not constitute a part of the present invention. The encipherers used to encipher the key of the month and the random number can be two different encipherers, but for the sake of hardware simplicity at the receive side, and consequent cost savings in mass production of the subscriber receivers, it is preferable that the same encipherers be used. The encipherer may employ any enciphering method as long as it has a sufficiently high level of security.

The PN sequence generator can be any general PN sequence generator as long as it also has sufficient security strength, e.g. a properly selected non-linear feedback shift register may suffice.

The random number generator in the transmitter may be a well known thermal noise generator which generates "true" random numbers, or it may be a pseudo-random number generator similar to the sequence generator 18, implemented in a well known manner with digital electronics or computer software. Similarly, the technique for combining the key of the month and the random number generator to produce the "seed" for the PN sequence generators 18 and 38 is not critical, with the simplest technique being a bit-by-bit modulo-2 addition of the two numbers.

In general, each of the functional blocks in the drawing can be implemented with existing techniques, with system complexity and cost and security strength depending on the particular implementation of each of the functional blocks.

The transformation of the simple cipherer is specified by a variable which is different for each channel or special program, and is changed every month.

The user ID code 30 within each subscriber set may be a set of binary switches or a bit pattern programmed into a read-only memory in a sealed box to prevent the subscriber from seeing or changing the number.

The use of a simple cipherer in addition to the non-linear feedback shift-register may seem to increase the system complexity unnecessarily. However, since only a small amount of data, namely the "seed", need be handled each time, and since the statistical properties of the cipherer do not impact to the output of the PN sequence generator, the cipherer can be very simple. One possible approach, for example, is a ROM table of random bits with or without cipher feedback. The use of this simple cipherer greatly simplifies the problem of cryptosynchronization and key distribution, and therefore reduces the overall system complexity.

Suitable alternatives for the scrambling of the program signals include conventional scrambling techniques such as on-off switching, randomly inverting lines, fields or frames, and delaying horizontal lines or fields by certain randomly fixed steps. In any case, the technique used will require the generation of a PN sequence which must be synchronized at both the transmit and receive sides.

What is claimed is:

1. In a communications system including a transmitter and a receiver, said transmitter including a program source for providing a program signal representing program information, a transmit signal processor for encrypting said program signal in accordance with a transmit control signal and transmit means for transmitting said encrypted signal, said receiver including receive means for receiving said encrypted signal, a receiver signal processor for decrypting said encrypted signal in accordance with a receive control signal and means for receiving said decrypted signal and providing said program information, the improvement comprising:

first generator means at said transmitter for generating a first sequence of signals representing a first sequence of numbers;

key number means at said transmitter for providing a key number signal representing a key number;

second generator means at said transmitter for generating a second sequence of signals representing a second sequence of numbers, said second generator means being periodically reset by a reset signal comprising the output of said first generator means to thereby generate a plurality of sequence segments each beginning with a reset signal, the output of said second generator means comprising said transmit control signal;

means at said transmitter for enciphering said first sequence of signals with said key number signal and for providing said enciphered first signal sequence to said transmit means for transmission with said encrypted program signal;

*means at said transmitter for enciphering said key number signal in accordance with a further signal;* means at said receiver for providing said key number signal, *said means at said receiver for providing said key number signal comprising means at said receiver for providing said further signal and means at said receiver for deciphering said enciphered key number signal in accordance with said further signal;* receive deciphering means at said receiver for receiving said enciphered first signal sequence and said key number, deciphering said first signal sequence in accordance with said key number and providing said deciphered first signal sequence as an output; and receive generating means for generating a sequence of signals representing said first sequence of numbers, said receive generating means being periodically reset by a reset signal comprising the output of said receive deciphering means to thereby generate said plurality of sequence segments, said plurality of sequence segments being provided by said receive generating means to said receive signal processor as said receive control signal.

2. A communications system as defined in claim 1, [further comprising:

means for providing] *wherein said further signal comprises* an identification number signal uniquely identifying said receiver[;

means for enciphering said key number signal with said identification signal;

means at said receiver for providing said identification number signal; and means at said receiver for receiving said identification number signal and said enciphered key number signal and for deciphering said key number signal, said deciphered key number signal being provided to said receive deciphering means].

3. A communications system as defined in [either one of claims 1 or 2] *claim 1*, wherein each of said reset signals provided to said second generator means comprises a combination of said key number signal and a signal of said first signal sequence, and wherein each of said reset signals provided to said receive generator means comprises a combination of said key number signal and a signal of said deciphered first signal sequence.

4. A communications systems as defined in claim 3, wherein said key number signal is changed at predetermined time intervals.

5. A communications system as defined in claim 4, wherein said second generator means is a non-linear pseudorandom sequence generator.

6. A communications system as defined in claim 3, wherein a plurality of receivers receive the encrypted signal transmitted by said transmitter, each of said receivers having a corresponding unique identification number and said enciphered key number received at each receiver being enciphered with the user identification number unique to said each receiver.

7. The communications system as defined in claim 6, wherein said first signal sequence represents a substantially random number sequence.

8. In a method of providing security in a signal transmission system, said method including the steps of encrypting in accordance with an encryption control signal a progam signal representing information, transmitting said encrypted signal, receiving said encrypted signal, decrypting said received encrypted signal in accordance with a decryption control signal and providing said information represented by said decrypted signal, the improvement comprising:

generating a key number signal representing a key number;

generating a first signal sequence representing a first sequence of numbers;

generating a second signal sequence representing a second sequence of numbers, said second signal sequence being periodically reset by a reset signal comprising a signal of said first signal sequence to thereby generate a plurality of second sequence segments;

providing said second sequence segments to said transmit signal processor as said encryption control signal;

enciphering said first signal sequence with said key number and providing said enciphered first sequence to said transmitter for transmission with said encrypted signal;

*enciphering said key number signal in accordance with a further signal;*

*deciphering said enciphered key number signal in accordance with said further signal at said receiver;* decrypting said enciphered first sequence at said receiver in accordance with said key number signal;

generating said second sequence segments at said receiver by resetting a receive number signal generator with a reset signal comprising said deciphered first signal sequence; and providing said second sequence segments to said receive signal processor as said decryption control signal.

9. A method as defined in claim 8, further [comprising:

enciphering said key number signal at said transmitter with] *wherein said further signal comprises* a user identification number signal uniquely identifying said receiver[;

transmitting said enciphered key number signal to said receiver;

deciphering said enciphered key number signal at said receiver in accordance with said user identification number signal uniquely identifying said receiver; and providing said deciphered key number signal to said deciphering means].

10. The method as defined in claim 9, further comprising the steps of:

combining said key number signal and a signal in said first sequence to obtain said reset signal in said transmitter; and combining said key number signal and a signal in said deciphered first sequence in order to obtain said reset signal in said receiver.

11. The method as defined in any one of claims 8–10, further comprising the step of periodically changing said key number signal.

12. The method as defined in claim 11, wherein said second generator means in said transmitter and said generator means in said receiver each generate non-linear pseudo-random signal sequences.

13. The method as defined in claim 12, wherein said first signal sequence represents a substantially random number sequence.

14. A communications system including a transmitter and a receiver, said system comprising:

a program source at said transmitter for providing a program signal representing program information;

first generator means at said transmitter for generating a first sequence of signals representing a first sequence of numbers;

key number means at said transmitter for providing a key number signal representing a key number;

transmit signal processing means at said transmitter responsive to at least said first sequence of signals for encrypting said program signal;

enciphering means at said transmitter for enciphering said first sequence of signals with said key number signal to provide an enciphered first signal sequence;

transmit means at said transmitter for transmitting said encrypted program signal and said enciphered first signal sequence;

*means at said transmitter for enciphering said key number signal in accordance with a further signal;* means at said receiver for providing said key number signal, *said means at said receiver for providing said key number signal comprising means at said receiver for providing said further signal and means at said receiver for deciphering said enciphered key number signal in accordance with said further signal;* receiver deciphering means at said receiver for receiving said enciphered first signal sequence and said key number, deciphering said first signal sequence in accordance with said key number and providing said deciphered first signal sequence as an output; and receive generating means at said receiver responsive to at least said output of said receive deciphering means for receiving and decrypting said encrypted program signal to obtain said program signal.

15. A communications system as defined in claim 14, wherein said transmit signal processing means includes encryption means for encrypting said program signal in accordance with an encryption control signal, and second generator means at said transmitter for generating a second sequence of signals representing a second sequence of numbers, said second generator means being periodically reset by a reset signal comprising at least the output of said first generator means to thereby generate a plurality of sequence segments each beginning with a reset signal, the output of said second generator means comprising said encryption control signal.

16. A communications system as defined in claim 15, wherein said reset signal comprises a combination of said key number signal and the output of said first generator means.

17. A method of providing security in a signal transmission system between a transmitter and a receiver, said method comprising the steps of:

providing a program signal representing information;

generating a first sequence of signals representing a first sequence of numbers;

providing a key number signal representing a key number;

encrypting said program signal in accordance with at least said first sequence of signals;

enciphering said first sequence of signals with said key number signal to provide an enciphered first signal sequence;

transmitting said encrypted program signal and said enciphered first signal sequence to said receiver;

*enciphering said key number signal in accordance with a further signal;* providing said key number signal at said receiver *by deciphering said enciphered key number signal in accordance with said further signal;* deciphering said first signal sequence at said receiver in accordance with said key number to obtain a deciphered first signal sequence; and decrypting said encrypted program signal at said receiver in accordance with at least deciphered first signal sequence to obtain said program signal.

18. A method as defined in claim 17, wherein said step of encrypting said program signal in accordance with at least said first sequence of signals comprises the steps generating a second sequence of signals representing a second sequence of numbers, said second sequence of signals comprising a plurality of sequence segments each beginning with a reset signal, said reset signal comprising at least said first signal sequence, [said] *and* encrypting said program signal in accordance with said second sequence of signals.

19. A method as defined in claim 18, wherein said reset signal comprises a combination of said key number signal and said first sequence of signals.

*20. In a communications system including a transmitter and a receiver, said transmitter including a program source for providing a program signal representing program information, a transmit signal processor for encrypting said program signal in accordance with a transmit control signal and transmit means for transmitting said encrypted signal, said receiver including receive means for receiving said encrypted signal, a receiver signal processor for decrypting said encrypted signal in accordance with a receive control signal and means for receiving said decrypted signal and providing said program information, the improvement comprising:*

*first generator means at said transmitter for generating a first sequence of signals representing a first sequence of numbers;*

*key number means at said transmitter for providing a key number signal representing a key number;*

*second generator means at said transmitter for generating a second sequence of signals representing a second sequence of numbers, said second generator means being periodically reset by a reset signal comprising the output of said first generator means to thereby generate a plurality of sequence segments each beginning with a reset signal, the output of said second generator means comprising said transmit control signal;*

*means at said transmitter for enciphering said first sequence of signals with said key number signal and for providing said enciphered first signal sequence to said transmit means for transmission with said encrypted program signal;*

*means at said receiver for providing said key number signal;*

*receive deciphering means at said receiver for receiving said enciphered first signal sequence and said key number, deciphering said first signal sequence in accordance with said key number and providing said deciphered first signal sequence as an output; and*

*receive generating means for generating a sequence of signals representing said first sequence of numbers, said receive generating means being periodically reset by a reset signal comprising the output of said receive deciphering means to thereby generate said plurality of sequence segments, said plurality of sequence segments being provided by said receive generating means to said receive signal processor as said receive control signal;*

*said communications system further comprising:*

*means for providing an identification number signal uniquely identifying said receiver;*

*means for enciphering said key number signal with said identification number signal;*

*means at said receiver for providing said identification number signal; and*

*means at said receiver for receiving said identification number signal and said enciphered key number signal and for deciphering said key number signal, said deciphered key number signal being provided to said receive deciphering means.*

*21. A communications system as defined in claim 20, wherein each of said reset signals provided to said second generator means comprises a combination of said key number signal and a signal of said first signal sequence, and wherein each of said reset signals provided to said receive generator means comprises a combination of said key number signal and a signal of said deciphered first signal sequence.*

*22. A communications system as defined in claim 21, wherein said key number signal is changed at predetermined time intervals.*

*23. A communications system as defined in claim 22, wherein said second generator means is a non-linear pseudorandom sequence generator.*

*24. A communications system as defined in claim 21, wherein a plurality of receivers receive the encrypted signal transmitted by said transmitter, each of said receivers having a corresponding unique identification number and said enciphered key number received at each receiver being enciphered with the user identification number unique to said each receiver.*

*25. A communications system as defined in claim 24, wherein said first signal sequence represents a substantially random number sequence.*

*26. In a method of providing security in a signal transmission system, said method including the steps of encrypting in accordance with an encryption control signal a program signal representing information, transmitting said encrypted signal, receiving said encrypted signal, decrypting said received encrypted signal in accordance with a decryption control signal and providing said information*

*represented by said decrypted signal, the improvement comprising:*

*generating a key number signal representing a key number;*

*generating a first signal sequence representing a first sequence of numbers;*

*generating a second signal sequence representing a second sequence of numbers, said second signal sequence being periodically reset by a reset signal comprising a signal of said first signal sequence to thereby generate a plurality of second sequence segments;*

*providing said second sequence segments to said transmit signal processor as said encryption control signal;*

*enciphering said first signal sequence with said key number and providing said enciphered first sequence to said transmitter for transmission with said encrypted signal;*

*decrypting said said enciphered first sequence at said receiver in accordance with said key number signal;*

*generating said second sequence segments at said receiver by resetting a receive number signal generator with a reset signal comprising said deciphered first signal sequence;*

*providing said second sequence segments to said receive signal processor as said decryption control signal;*

*said method further comprising:*

*enciphering said key number signal at said transmitter with a user identification signal uniquely identifying said receiver;*

*transmitting said enciphered key number signal to said receiver;*

*deciphering said enciphered key number signal at said receiver in accordance with said user identification number signal uniquely identifying said receiver; and*

*providing said deciphered key number signal to said deciphering means.*

*27. The method as defined in claim 26, further comprising the steps of:*

*combining said key number signal and a signal in said first sequence to obtain said reset signal in said transmitter; and*

*combining said key number signal and a signal in said deciphered first sequence in order to obtain said reset signal in said receiver.*

*28. The method as defined in any one of claims 26 or 27, further comprising the step of periodically changing said key number signal.*

*29. The method as defined in claim 28, wherein said second generator means in said transmitter and said generator means in said receiver each generate non-linear pseudo-random signal sequences.*

*30. The method as defined in claim 29, wherein said first signal sequence represents a substantially random number sequence.*

*31. A communications system including a transmitter and a receiver, said system comprising:*

*a program source at said transmitter for providing a program signal representing program information;*

*first generator means at said transmitter for generating a first sequence of signals representing a first sequence of numbers;*

*key number means at said transmitter for providing a key number signal representing a key number;*

*transmit signal processing means at said transmitter responsive to at least said first sequence of signals for encrypting said program signal;*

*enciphering means at said transmitter for enciphering said first sequence of signals with said key number signal to provide an enciphered first signal sequence;*

*transmit means at said transmitter for transmitting said encrypted program signal and said enciphered first signal sequence;*

*means at said receiver for providing said key number signal;*

*receive deciphering means at said receiver for receiving said enciphered first signal sequence and said key number, deciphering said first signal sequence in accordance with said key number and providing said deciphered first signal sequence as an output; and*

*receive generating means at said receiver responsive to at least said output of said receive deciphering means for receiving and decrypting said encrypted program signal to obtain said program signal;*

*wherein said transmit signal processing means includes encryption means for encrypting said program signal in accordance with an encryption control signal, and second generator means at said transmitter for generating a second sequence of signals representing a second sequence of numbers, said second generator means being periodically reset by a reset signal comprising at least the output of said first generator means to thereby generate a plurality of sequence segments each beginning with a reset signal, the output of said second generator means comprising said encryption control signal; and*

*wherein said reset signal comprises a combination of said key number signal and the output of said first generator means.*

*32. A method of providing security in a signal transmission system between a transmitter and a receiver, said method comprising the steps of:*

*providing a program signal representing information;*

*generating a first sequence of signals representing a first sequence of numbers;*

*providing a key number signal representing a key number;*

*encrypting said program signal in accordance with at least said first sequence of signals;*

*enciphering said first sequence of signals with said key number signal to provide an enciphered first signal sequence;*

*transmitting said encrypted program signal and said enciphered first signal sequence to said receiver;*

*providing said key number signal at said receiver;*

*deciphering said first signal sequence at said receiver in accordance with said key number to obtain a deciphered first signal sequence; and*

*decrypting said encrypted program signal at said receiver in accordance with at least said deciphered first signal sequence to obtain said program signal;*

*wherein said step of encrypting said program signal in accordance with at least said first sequence of signals comprises the steps of generating a second sequence of signals representing a second sequence of numbers, said second sequence of signals comprising a plurality of sequence segments each beginning with a reset signal, said reset signal comprising at least said first signal sequence, and encrypting said program signal in accordance with said second sequence of signals; and*

*wherein said reset signal comprises a combination of said key number signal and said first sequence of signals.*

*33. A communications system as defined in claim 1, wherein said further signal is fixed during normal operation of said system.*

*34. A communications system as defined in claim 1, wherein said key number signal is periodically changed.*

*35. A communications system as defined in claim 34, wherein said key number signal changes at a rate slower than the signals of said first sequence of signals.*

*36. A method as defined in claim 8, wherein said further signal is fixed during normal operation of said system.*

*37. A method as defined in claim 8, wherein said step of generating said key number signal comprises periodically changing said key number signal.*

*38. A method as defined in claim 37, wherein said key number signal is changed at a rate slower than the signals of said first sequence of signals.*

*39. A communications system as defined in claim 14, wherein said further signal is fixed during normal operation of said system.*

*40. A communications system as defined in claim 14, wherein said key number signal is periodically changed.*

*41. A communications system as defined in claim 40, wherein said key number signal changes at a rate slower than the signals of said first sequence of signals.*

*42. A method as defined in claim 17, wherein said further signal is fixed during normal operation of said system.*

*43. A method as defined in claim 17, wherein said step of generating said key number signal comprises periodically changing said key number signal.*

*44. A method as defined in claim 43, wherein said key number signal is changed at a rate slower than the signals of said first sequence of signals.*

*45. A communications system including a transmitter and a receiver, said system comprising:*

*a program source at said transmitter for providing a program signal representing program information:*

*first generator means at said transmitter for generating a first sequence of signals representing a first sequence of numbers common to all receivers receiving said program information;*

*key number means at said transmitter for providing a key number signal representing a key number common to all receivers receiving said program information;*

*transmit signal processing means at said transmitter responsive to at least said first sequence of signals for encrypting said program signal;*

*enciphering means at said transmitter for enciphering said first sequence of signals with said key number signal to provide an enciphered first signal sequence;*

*transmit means at said transmitter for transmitting said encrypted program signal and said enciphered first signal sequence;*

*means at said receiver for providing said key number signal;*

*receive deciphering means at said receiver for receiving said enciphered first signal sequence and said key number, deciphering said first signal sequence in accordance with said key number and providing said deciphered first signal sequence as an output; and*

*receive generating means at said receiver responsive to at least said output of said receive deciphering means for receiving and decrypting said encrypted program signal to obtain said program signal.*

*46. A method of providing security in a signal transmission system between a transmitter and a receiver, said method comprising the steps of:*

*providing a program signal representing information;*

*generating a first sequence of signals representing a first sequence of numbers common to all receivers receiving said information;*

*providing a key number signal representing a key number common to all receivers receiving said information;*

*encrypting said program signal in accordance with at least said first sequence of signals;*

*enciphering said first sequence of signals with said key number signal to provide an enciphered first signal sequence;*

*transmitting said encrypted program signal and said enciphered first signal sequence to said receiver;*

*providing said key number signal at said receiver;*

*deciphering said first signal sequence at said receiver in accordance with said key number to obtain a deciphered first signal sequence; and*

*decrypting said encrypted program signal at said receiver in accordance with said first signal sequence to obtain said program signal.*

*47. A communications system including a transmitter and a receiver, said system comprising:*

*a program source at said transmitter for providing a program signal representing program information;*

*first generator means at said transmitter for generating a first sequence of signals representing a first sequence of numbers changing at least several times per minute;*

*key number means at said transmitter for providing a key number signal representing a key number;*

*transmit signal processing means at said transmitter responsive to at least said first sequence of signals for encrypting said program signal;*

*enciphering means at said transmitter for enciphering said first sequence of signals with said key number signal to provide an enciphered first signal sequence;*

*transmit means at said transmitter for transmitting said encryted program signal and said enciphered first signal sequence;*

*means at said receiver for providing said key number signal;*

*receive deciphering means at said receiver for receiving said enciphered first signal sequence and said key number, deciphering said first signal sequence in accordance with said key number and providing said deciphered first signal sequence as an output; and*

*receive generating means at said receiver responsive to at least said output of said receive deciphering means for receiving and decrypting said encrypted program signal to obtain said program signal.*

*48. A communications system according to claim 47, wherein the numbers in said first sequence of numbers change approximately once per second.*

*49. A method of providing security in a signal transmission system between a transmitter and a receiver, said method comprising the steps of:*

*providing a program signal representing information;*

*generating a first sequence of signals representing a first sequence of numbers changing at least several times per minute;*

*providing a key number signal representing a key number;*

*encrypting said program signal in accordance with at least said first sequence of signals;*

*enciphering said first sequence of signals with said key number signal to provide an enciphered first signal sequence;*

*transmitting said encrypted program signal and said enciphered first signal sequence to said receiver;*

*providing said key number signal at said receiver;*

*deciphering said first signal sequence at said receiver in accordance with said key number to obtain a deciphered first signal sequence; and*

*decrypting said encrypted program signal at said receiver in accordance with said first signal sequence to obtain said program signal.*

*50. A method according to claim 49, wherein the numbers in said first sequence of numbers change approximately once per second.*

* * * * *